US012783200B2

(12) United States Patent
Kaburlasos

(10) Patent No.: US 12,783,200 B2
(45) Date of Patent: Nov. 3, 2026

(54) MULTI-DISPLAY CONTROLLER

(71) Applicant: NXP B.V., Eindhoven (NL)

(72) Inventor: Nikos Kaburlasos, Mougins (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 19/016,163

(22) Filed: Jan. 10, 2025

(65) Prior Publication Data

US 2025/0224911 A1 Jul. 10, 2025

(30) Foreign Application Priority Data

Jan. 10, 2024 (EP) .................................... 24305069

(51) Int. Cl.
*G06F 3/14* (2006.01)
*G02B 27/01* (2006.01)
*G06F 3/01* (2006.01)

(52) U.S. Cl.
CPC ....... *G06F 3/1446* (2013.01); *G02B 27/0101* (2013.01); *G06F 3/013* (2013.01); *G02B 2027/0138* (2013.01); *G02B 2027/0181* (2013.01); *G02B 2207/101* (2013.01)

(58) Field of Classification Search
CPC ............................ B60K 35/22; B60K 2360/21
See application file for complete search history.

(56) References Cited

U.S. PATENT DOCUMENTS

| | | | | |
|---|---|---|---|---|
| 11,144,052 | B2 * | 10/2021 | Stent | G06V 20/597 |
| 11,164,352 | B2 | 11/2021 | Surti et al. | |
| 11,354,848 | B1 | 6/2022 | Surti et al. | |
| 12,373,087 | B2 * | 7/2025 | Strassberger | B60K 35/80 |
| 2002/0003571 | A1 * | 1/2002 | Schofield | B60C 23/00 348/148 |
| 2009/0058887 | A1 * | 3/2009 | Lin | G06F 3/14 345/690 |
| 2016/0048022 | A1 * | 2/2016 | Shen | G02B 27/0172 345/8 |
| 2018/0300951 | A1 | 10/2018 | Surti et al. | |
| 2020/0241824 | A1 * | 7/2020 | Lee | G06F 3/165 |
| 2022/0270570 | A1 | 8/2022 | Welsch et al. | |

* cited by examiner

*Primary Examiner* — Nan-Ying Yang

(57) ABSTRACT

One example discloses a multi-display controller, including: a focus detector configured to detect an attention of a user; and one or more rendering engines configured to vary an attribute of at least one display in a set of two or more displays based the attention of the user.

18 Claims, 6 Drawing Sheets

Set of Displays 102

100

MULTI-DISPLAY CONTROLLER

CROSS-REFERENCE TO RELATED APPLICATIONS

This application claims the priority under 35 U.S.C. § 119 of European Patent application no. 24305069.7, filed on 10 Jan. 2024, the contents of which are incorporated by reference herein.

The present specification relates to systems, methods, apparatuses, devices, articles of manufacture and instructions for controlling multiple displays.

SUMMARY

According to an example embodiment, a multi-display controller, comprising: a focus detector configured to detect an attention of a user; and one or more rendering engines configured to vary an attribute of at least one display in a set of two or more displays based the attention of the user.

In another example embodiment, the focus detector is configured to detect at least one of the user's: gaze, eye movements, touch, voice command, or body positioning.

In another example embodiment, the focus detector is at least one of: a camera, a touch sensitive display, a button, a microphone, an infrared detector, a wireless device, or a pressure sensor.

In another example embodiment, the focus detector is configured to detect an attention of each user in a set of two or more users.

In another example embodiment, the focus detector is configured to detect a separate attention for each user in a set of users; and the rendering engine is configured to separately vary an attribute of those displays that have the separate attention of each user in the set of users.

In another example embodiment, the set of users includes a driver and a passenger.

In another example embodiment, the set of users includes a primary user and an audience of two or more additional users.

In another example embodiment, the attribute includes at least one of: a power supplied, a power mode, network communications bandwidth, refresh rate, brightness, or pixel resolution or other parameters which may affect the quality of rendered image In another example embodiment, the rendering engine is configured to adjust the attribute of the at least one display to a higher quality as soon as the attention of the user is on the at least one display.

In another example embodiment, the rendering engine is configured to adjust the attribute of the at least one display to a highest quality.

In another example embodiment, the rendering engine is configured to adjust the attribute of the at least one display to a lower quality as soon as the attention of the user is not on the at least one display.

In another example embodiment, the rendering engine is configured to adjust the attribute of the at least one display to a lowest quality.

In another example embodiment, the rendering engine is configured to delay adjusting the attribute of the at least one display until the attention of the user is either on or not on the at least one display for a predetermined time period.

In another example embodiment, the rendering engine is configured to gradually adjust the attribute from a first attribute value to a second attribute value over a predetermined time period.

In another example embodiment, the display is at least one of: a vehicle display, a windshield display, a dashboard display, an instrument cluster display, a steering wheel display, a center console display, a back seat display, a head rest display, a ceiling display, a vehicle body panel display, a smartphone display, a paired display, a wirelessly connected display, an office display, a concert display, a home display, a security display, a light show display, a computer display, a set of light elements, or a television display.

In another example embodiment, each display in the set of displays is separately operable.

In another example embodiment, each display in the set of displays is physically separate.

In another example embodiment, each display in the set of displays includes a separate complete stand-alone set of display electronics.

In another example embodiment, each display in the set of displays only shares a common power supply.

According to an example embodiment, a method for controlling multiple displays, comprising: detecting an attention of a user; and varying an attribute of at least one display in a set of two or more displays based the attention of the user.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
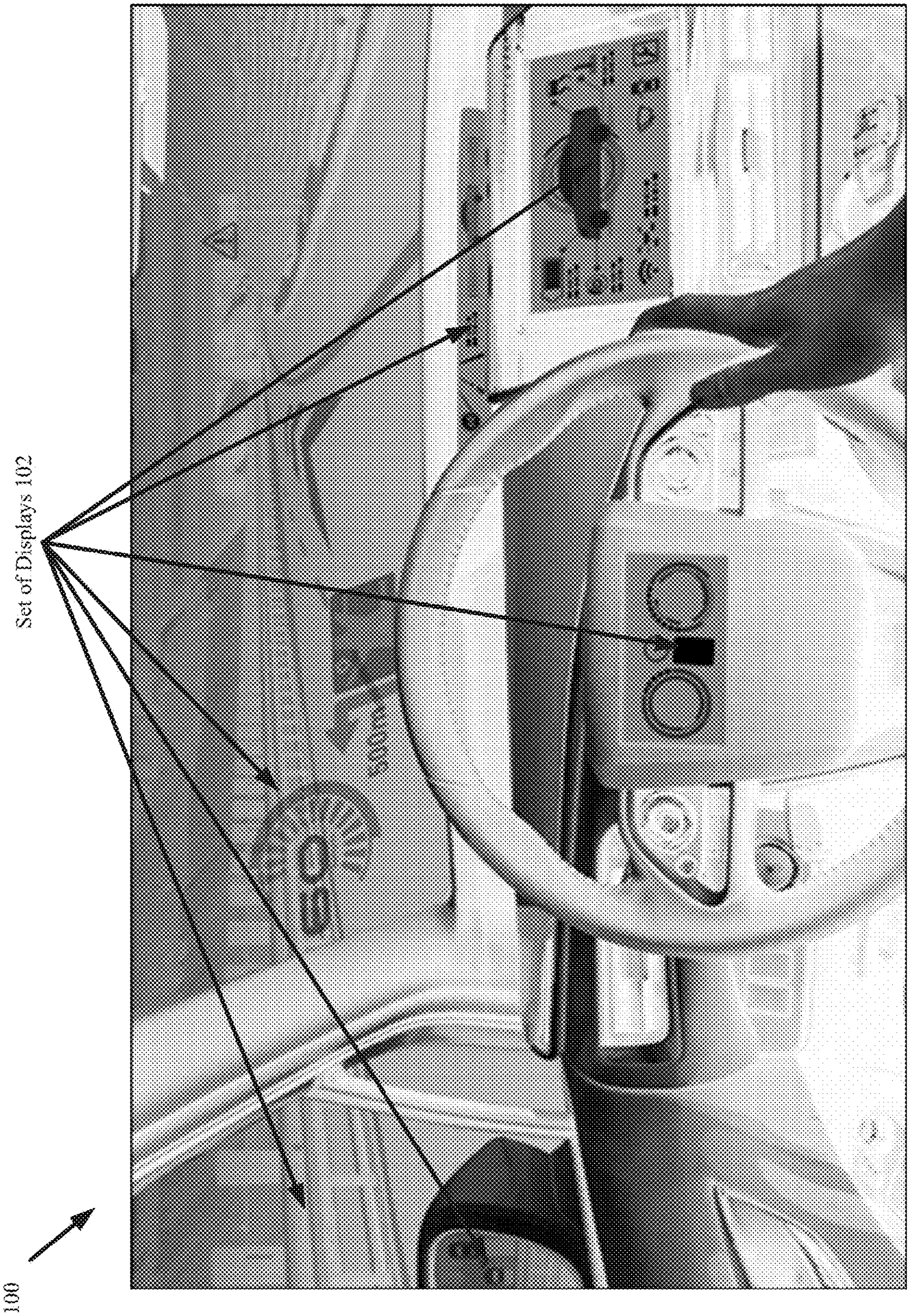
FIG. 1 represents an example vehicle environment.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

FIG. 1 represents an example vehicle environment 100. Modern vehicles, such as cars, often provide information (e.g. images, pictures, video, and or other data) on multiple displays 102. More and more displays are being used in cars to make various types of information available to the driver.

For example, a cluster display is typically placed behind the steering wheel to display various vehicle gauges (speed, fuel level etc), an IVI (In-Vehicle Infotainment) display is used to show navigation information, 3D graphics, rear-view camera images etc., a HUD (Head-up Display) uses the vehicle's windshield to display speedometer, tachometer, navigation, and other information. Many more displays throughout a modern car are also possible.

Drivers however can only focus their gaze on one display at a time. When the driver is not focusing their eyes on a particular display, the information displayed on that display is either not noticed at all by the driver or it can only be seen via the driver's peripheral vision and hence, not very clearly.

These displays, however, are kept fully active/enabled at full information rendering capability all the time, even though a user (e.g. a vehicle driver) is only focused on one display at a time, and often may not even be looking at any displays at all (e.g. while focusing on the road ahead).

Such always-on and fully-rendered information displays result in constant power dissipation. Keeping these displays active requires that silicon components which drive the displays dissipate power as they are working to produce frames of pixels to be projected on to each display and to constantly refresh the displays at a certain rate, e.g. 60 frames/sec.

Displaying information on multiple separate displays 102 which are not actively looked at full quality (high resolution, high frame rate etc.) not only uses extra energy, but in some applications does not enhance a user's experience nor help in navigating the vehicle safely.

Now discussed is a multi-display controller and method for controlling multiple displays that varies one or more attributes of a set of displays depending upon which of those displays one or more users have focused their attention on.

Attributes varied can include: image render quality (e.g. a refresh rate, a brightness, a resolution (e.g. number of pixels)); power supplied reduced (e.g. turn off the displays); modifying a power mode (e.g. place display in a standby mode); reducing network communications (e.g. CAN bus, or wireless connections) to the display.

By reducing power consumption for the other displays, additional power becomes available for extending an electric vehicle's range, improving battery life, better thermal management, and longer circuit life.

By reducing bus traffic on the vehicle's network, network speed for those displays the user is focused on and other vehicle devices can be increased, thus enhancing the user's experience.

Figure 2:
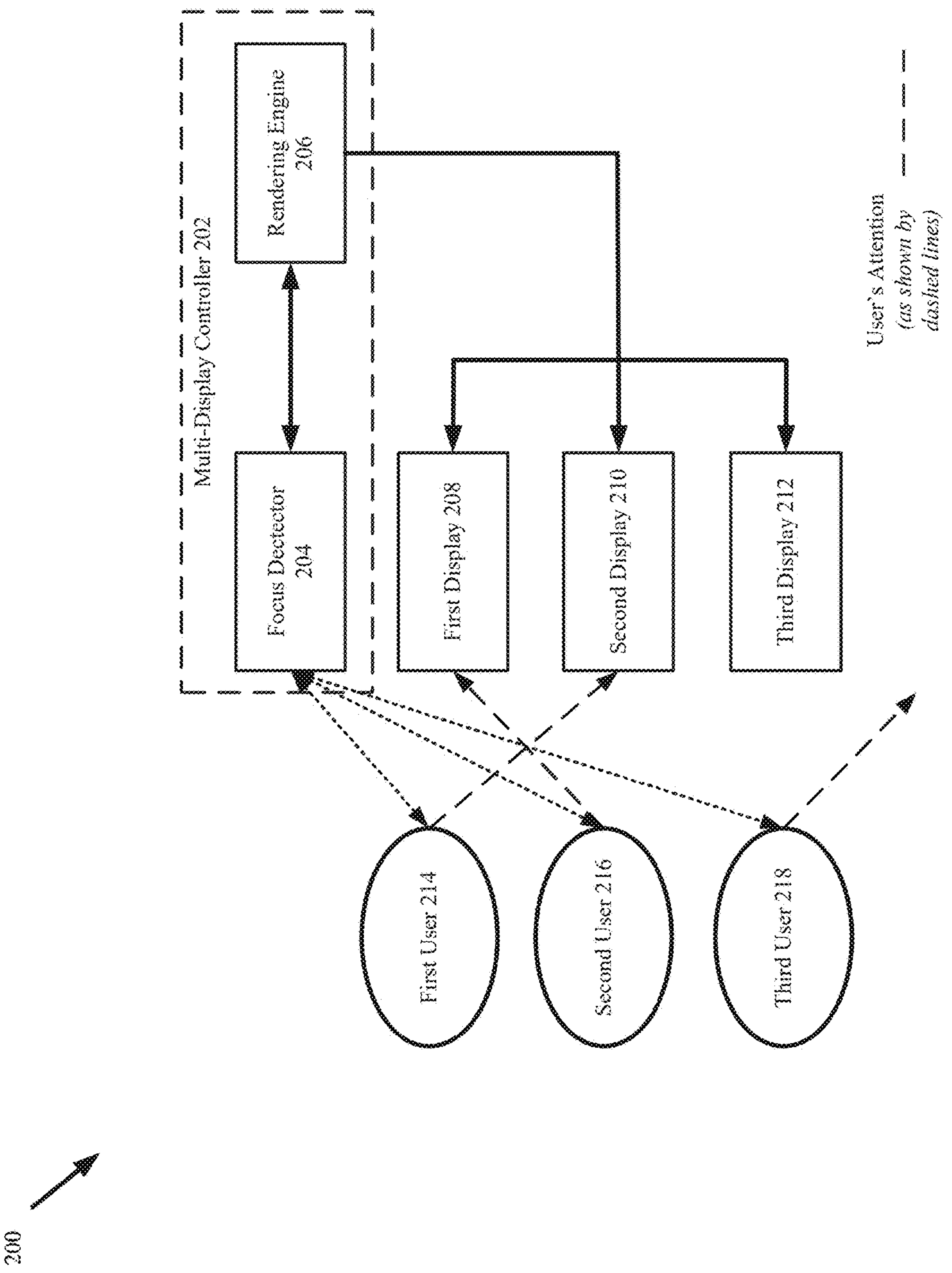
FIG. 2 represents an example system for multi-display control.

FIG. 2 represents an example system 200 for multi-display control. The example system 200 includes a multi-display controller 202 having a focus detector 204 and a rendering engine 206, a set of displays 208, 210, 212, a set of users 214, 216, 218, and attention (dashed lines) areas. This image shows a single rendering engine 206 for simplicity, though in general each display has its own render engine—in fact there may be more than one render engines driving a single display.

The focus detector 204 is configured to detect an attention for each of the users 214, 216, 218. In this example embodiment, the first user 214 is focuses attention on the second display 210, the second user 216 is focuses attention on the first display 208, and the third user 218 isn't focused on any of the displays 208, 210, 212. Thus the focus detector 204 can be configured to detect a separate attention for each of the users 214, 216, 218, or multiple focus detectors 204 at multiple locations in the vehicle can be employed.

The focus detector 204 can be configured to detect at least one of: a user's gaze, a user's touch, a user's voice command, and/or a user's body positioning when determining which user is focused on which display or if not focused on any of the displays.

The focus detector 204 in various example embodiments can be: a camera, a touch sensitive display, a button, a microphone, an infrared detector, a wireless device, a pressure sensor, or a combination of these.

The displays 208, 210, 212 can be any of: a vehicle display, a windshield display, a dashboard display, an instrument cluster display, a steering wheel display, a center console display, a back seat display, a head rest display, a ceiling display, a vehicle body panel display, a smartphone display, a paired display, a wirelessly connected display, an office display, a concert display, a home display, a security display, a light show display, a computer display, a set of light elements, or a television display. Other displays, depending upon application, are also possible.

To distinguish between what is meant by "multiple displays", as contrasted with "multiple portions" of a "single display", the following example embodiments are provided. A display generally consists of a display panel which is driven by a separate/dedicated display engine, which pulls frames that are stored in system memory or cache and then projects them on the display panel. It is possible to have two or more image render engines produce frames which are merged into a single frame buffer in memory, then that frame buffer is pulled by the display engine and projected on to the display panel. For example, when you watch a movie on your desktop, you may be seeing a separate media-application window which is projected on your desktop buffer. In this case you really have two render engines at work, one producing your desktop image and the other one the movie image, which are then merged into a single display buffer which is stored in memory; then the display engine pulls it from there and projects it on the display panel. So what makes a display separate from another display is that it has its own dedicated display engine which drives this display, while there may be multiple image render engines which contribute to what is displayed on the single display.

For example, the multiple displays are: separately operable; physically separate stand alone devices; and/or includes a completely separate display engine, which uses rendered images to periodically refresh the display.

The rendering engine 206 is configured to vary an attribute of at least one of the displays 208, 210, 212 based the attention of each of the users 214, 216, 218.

The one or more attributes varied for one or more of the displays 208, 210, 212 includes: a power mode, network communications bandwidth, refresh rate, brightness, and a pixel resolution. Other display attributes, depending upon application, are also possible.

In some example embodiments, the rendering engine 206 is configured to adjust the attribute of the at least one display to a higher quality as soon as the attention of the user is on the at least one display. The rendering engine 206 could alternately be configured to adjust the attribute of the at least one display to a highest quality.

The rendering engine 206 is then configured to adjust the attribute of the at least one display to a lower quality as soon as the attention of the user is not on the at least one display. The rendering engine 206 could alternately be configured to adjust the attribute of the at least one display to a lowest quality.

In various example embodiments, the rendering engine 206 is configured to delay adjusting the attribute of the at least one display until the attention of the user is either on or not on the at least one display for a predetermined time period. The rendering engine 206 can also be configured to gradually adjust the attribute from a first attribute value to a second attribute value over a predetermined time period.

Figure 3:
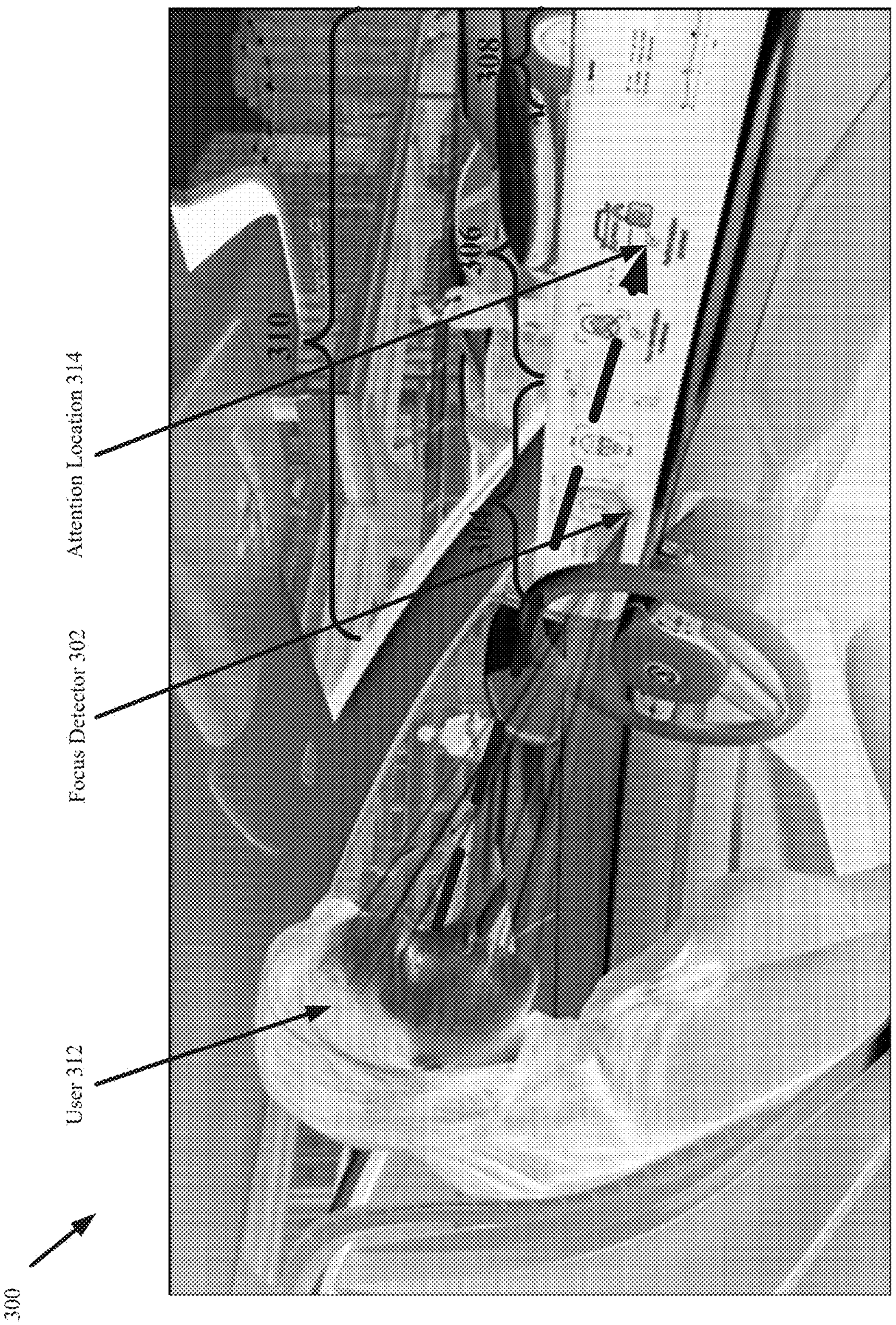
FIG. 3 represents an example vehicle application using the system for multi-display control.

FIG. 3 represents an example vehicle application 300 for using the system 200 for multi-display control. In this application the system for multi-display control 200 includes a multi-display controller (not shown), a focus detector 302, a rendering engine (not shown), a set of displays 304, 306, 308, 310, a user 312, and an attention location 314 (dashed line).

The example vehicle application 300 shows a camera (i.e. focus detector 302) positioned behind a vehicle's steering wheel which keeps track of the driver's (i.e. user 312) face. Frames captured by the camera (i.e. focus detector 302) are processed to detect the driver's attention location 314. Such processing can include tracking the user's 312 eye movements or gaze. Other focus detector 302 sensor may be implemented as well that track the user's 312 touch, voice commands, and/or body positioning.

If the driver is currently looking at an IVI display (i.e. the second display 306) positioned in the middle of the dashboard then there is no need for the HUD display (i.e. the fourth display 310) to also be active at full quality and resolution on the windshield at the same time, since the driver is not paying attention to it at that time.

Circuits and/or algorithms in either the focus detector 302 or the rendering engine, or distributed between them both, can run in the background to process frames captured by the camera to determine things like: which display the driver is or is not currently focusing their eyes on; for how long the driver has been looking away from a given display; and patterns in a way the driver's eyes observe the various displays.

For example, the longer the driver's eyes have been looking away from a given display, the less interested the user 312 is on the information displayed on that display and, hence, the greater the potential to reduce the quality of the image on the display or to turn off that display.

Additionally, if the driver has a pattern of looking at the first display 304 for 5-10 secs and then turning their eyes to the second display 306, then a possible action would be to ensure that the second display 306 is on at full quality after the driver has spent 5-10 seconds looking at the first display 304. Remaining displays are either only seen via driver's peripheral vision or are not seen by driver at all.

By reducing the quality of rendered images on displays 304, 306, 308, 310 which the user 312 is not focused upon, or stopping such rendering altogether, power dissipation can be reduced, which would help improve thermal behavior of various circuits embedded into the vehicle, help extend the vehicle's battery range, and/or free up vehicle network bandwidth for other tasks.

Energy could be saved if those displays could be either turned off or at least be re-configured to display information at lower quality (e.g. lower resolution or lower frame rate), for as long as the driver's eyes are not focusing on these displays. Doing so would require lower amount of processing and lower power dissipation on the silicon components which drive the displays improving the thermal behavior of these components and benefit the vehicle's battery life. In most example embodiments however, the images rendered on a display would return to a substantially higher quality level the moment the driver turns their gaze on to that display.

Figure 4:
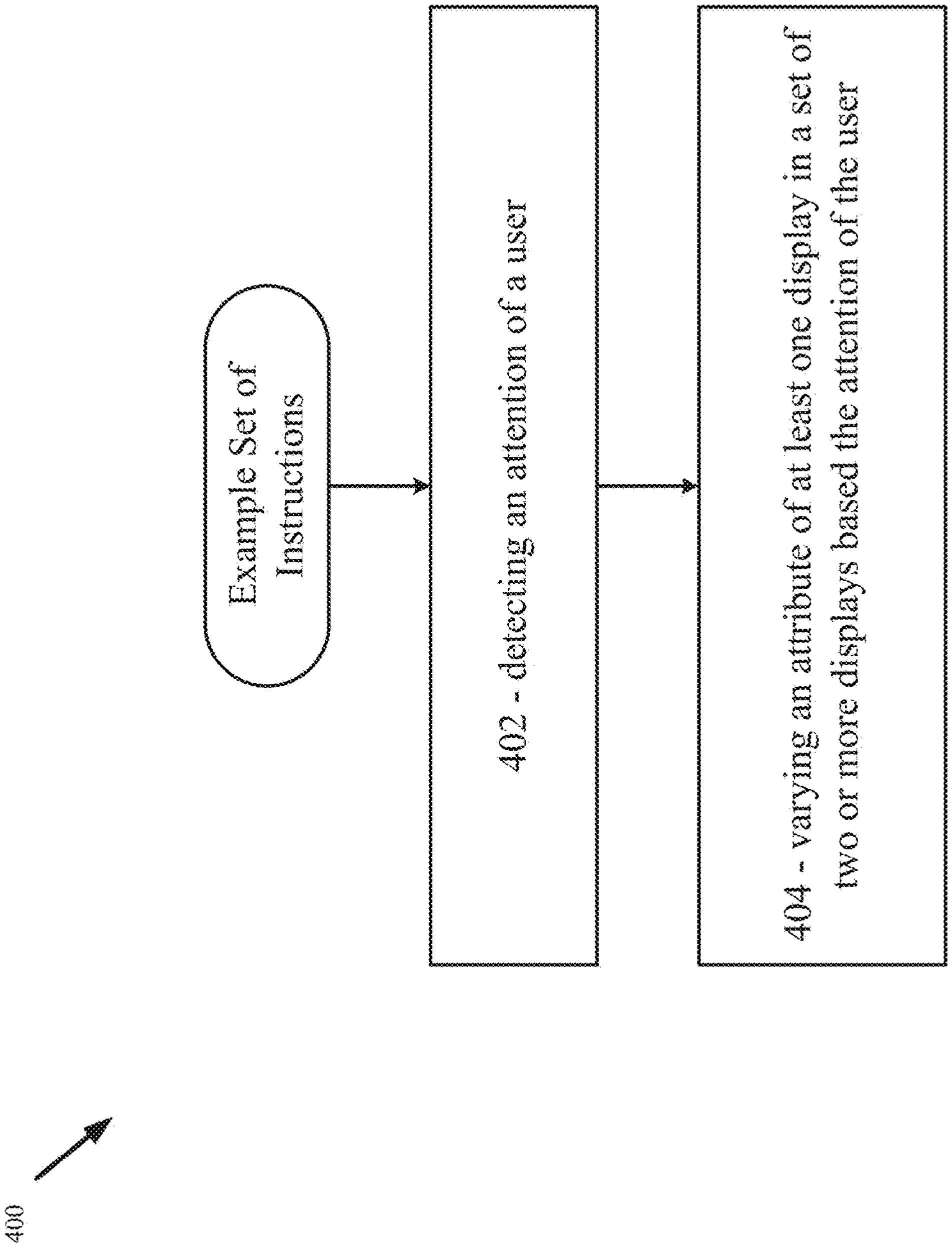
FIG. 4 represents a first example set of instructions for enabling the multi-display controller.

FIG. 4 represents a first example set of instructions 400 for enabling the multi-display controller 202. The order in which the instructions are discussed does not limit the order in which other example embodiments implement the instructions unless otherwise specifically stated. Additionally, in some embodiments the instructions are implemented concurrently.

A first example instruction set begins in 402, by detecting an attention of a user. Next, in 404, varying an attribute of at least one display in a set of two or more displays based the attention of the user.

Figure 5:
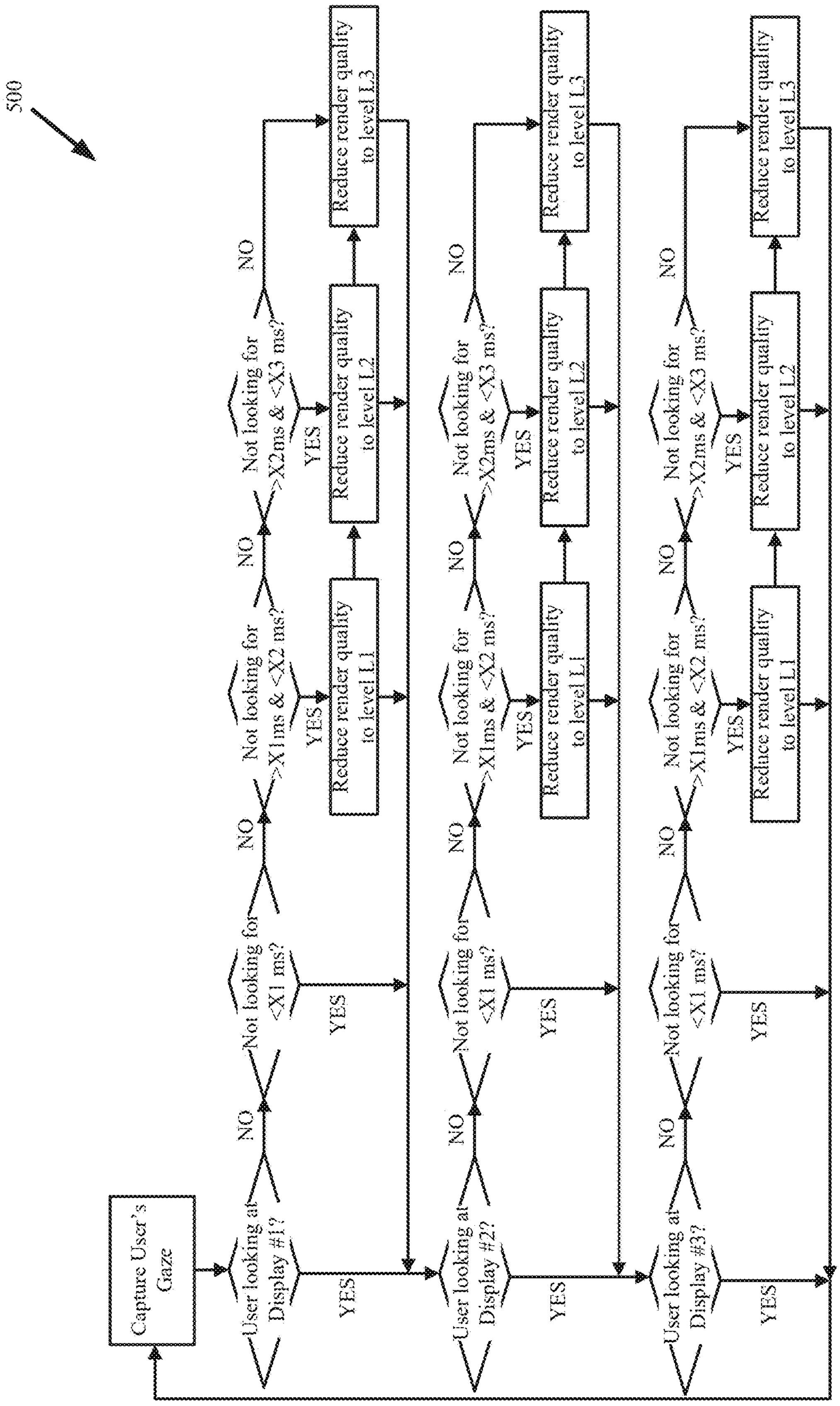
FIG. 5 represents a second example set of instructions for enabling the multi-display controller.

FIG. 5 represents a second example set of instructions 500 for enabling the multi-display controller 202. These instructions 500 define a set of time windows before a rendering quality is changed. In each of the three display paths (e.g. for display #1, display #2, and display #3) rendering quality is gradually decreased as the user's gaze is focused elsewhere.

The second example set of instructions 500 show how a set of displays can be managed in a vehicle that includes three displays and one camera. Every time the camera (e.g. focus detector 204) captures an image, the rendering engine 206 checks to see whether the driver's eyes are focusing on Display #1 or #2 or #3.

If the driver has been looking at display #N or has not been looking at display #N for only short period of time (<X1 ms), then no action is taken.

If the driver has not been looking at display #N for longer than X1 ms but less than X2 ms, then an action can be taken to reduce the quality of the image on display #N to level L1. This may for example mean that the pixel resolution on display #N is reduced by half If the driver has not been looking at display #N for longer than X2 ms but less than X3 ms, then an action can be taken to reduce the quality of the image on display #N to level L2. This may for example mean that the display frame rate reduces by one-fourth etc.

If the driver has not been looking at display #N for longer than X3 ms, then an action can be taken to reduce the quality of the image on display #N to level L3. This may for example mean that the display is completely turned off.

Using the second example set of instructions 500, a quality of the image displayed on given display may be reducing gradually over time (leading to gradually increasing power savings) the longer the driver is not looking at the display.

Note, this is only one possible scheme of power managing the vehicle displays based on the driver's gaze. As explained earlier, other power managing schemes may be used as well, e.g. taking into account patterns based on which the driver looks at various displays.

In various example embodiments the set of instructions described above are implemented as functional and software instructions. In other embodiments, the instructions can be implemented either using logic gates, application specific chips, firmware, as well as other hardware forms.

Figure 6:
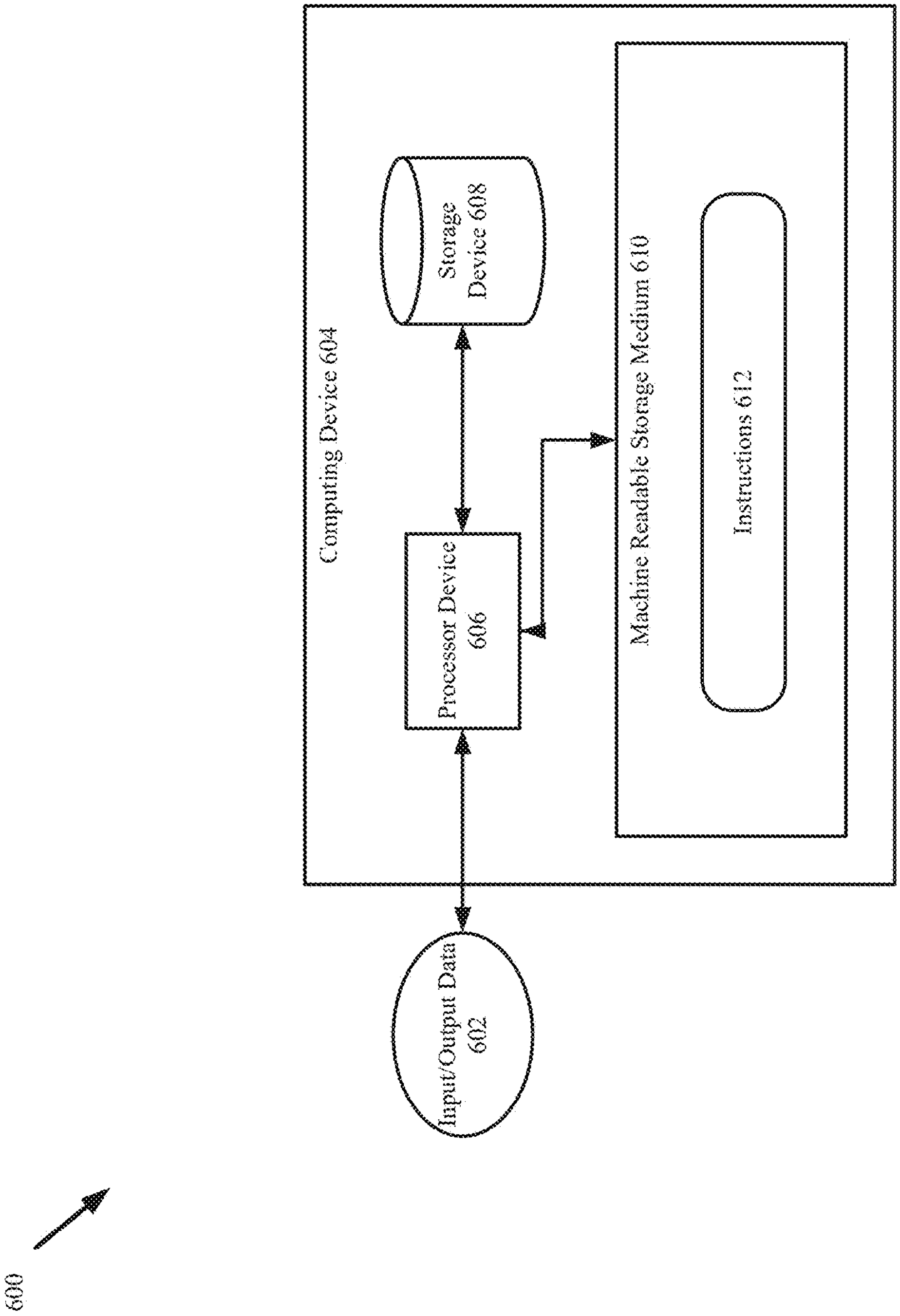
FIG. 6 represents an example system for hosting instructions for enabling the multi-display controller.

FIG. 6 represents an example system 600 for hosting instructions for enabling the multi-display controller 202. The system 600 shows an input/output data 602 interface with an electronic apparatus 604. The electronic apparatus 604 includes a processor 606, a storage device 608, and a non-transitory machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a non-transitory computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transitory machine-readable storage medium using a bus and performs operations and tasks that implement one or more instructions stored in the machine-readable storage medium. The machine-readable storage medium in an alternate example embodiment is a computer-readable storage medium.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A multi-display controller, comprising:

a focus detector configured to detect an attention of a user; and one or more rendering engines configured to vary an attribute of one display in a set of two or more physically separate displays based on the attention of the user;

wherein each of the physically separate displays includes a separate dedicated display engine configured to separately drive each of the physically separate displays based on a set of rendered images received from the rendering engines in the multi-display controller;

wherein the rendering engine is configured to delay adjusting the attribute of the one display until the attention of the user is either on or not on the at least one display for a predetermined time period.

2. The controller of claim 1:

wherein the focus detector is configured to detect at least one of the user's: gaze, eye movements, touch, voice command, or body positioning.

3. The controller of claim 1:

wherein the focus detector is at least one of: a camera, a touch sensitive display, a button, a microphone, an infrared detector, a wireless device, or a pressure sensor.

4. The controller of claim 1:

wherein the focus detector is configured to detect an attention of each user in a set of two or more users.

5. The controller of claim 1:

wherein the focus detector is configured to detect a separate attention for each user in a set of users; and wherein the rendering engine is configured to separately vary an attribute of those displays that have the separate attention of each user in the set of users.

6. The controller of claim 5:

wherein the set of users includes a driver and a passenger.

7. The controller of claim 5:

wherein the set of users includes a primary user and an audience of two or more additional users.

8. The controller of claim 1:

wherein the attribute includes at least one of: a power supplied, a power mode, network communications bandwidth, refresh rate, brightness, or pixel resolution or other parameters which may affect a quality of a rendered image on the one display.

9. The controller of claim 1:

wherein the rendering engine is configured to adjust the attribute of the at least one display to a higher quality as soon as the attention of the user is on the at least one display.

10. The controller of claim 9:

wherein the rendering engine is configured to adjust the attribute of the at least one display to a highest quality.

11. The controller of claim 1:

wherein the rendering engine is configured to adjust the attribute of the at least one display to a lower quality as soon as the attention of the user is not on the at least one display.

12. The controller of claim 11:

wherein the rendering engine is configured to adjust the attribute of the at least one display to a lowest quality.

13. The controller of claim 1:

wherein the rendering engine is configured to gradually adjust the attribute from a first attribute value to a second attribute value over a predetermined time period.

14. The controller of claim 1:

wherein the display is at least one of: a vehicle display, a windshield display, a dashboard display, an instrument cluster display, a steering wheel display, a center console display, a back seat display, a head rest display, a ceiling display, a vehicle body panel display, a smartphone display, a paired display, a wirelessly connected display, an office display, a concert display, a home display, a security display, a light show display, a computer display, a set of light elements, or a television display.

15. The controller of claim 1:
wherein each display in the set of displays is separately operable.

16. The controller of claim 1:
wherein each display in the set of displays is physically separate.

17. The controller of claim 1:
wherein each display in the set of displays includes a separate complete stand-alone set of display electronics.

18. The controller of claim 1:
wherein each of the physically separate displays is a stand-alone display that is physically separate from the multi-display controller and only shares a common power supply with the multi-display controller.

* * * * *